United States Patent [19]

Rhodes et al.

[11] 4,133,666

[45] Jan. 9, 1979

[54] METHOD AND APPARATUS FOR MAKING VARIEGATED GLASS IN A CONTINUOUS SHEET

[75] Inventors: Jerry D. Rhodes, Kent; Roger B. Ek, Bellevue, both of Wash.

[73] Assignee: Spectrum Glass Company, Inc., Seattle, Wash.

[21] Appl. No.: 901,077

[22] Filed: Apr. 28, 1978

[51] Int. Cl.² .............................................. C03B 13/08
[52] U.S. Cl. ..................................... 65/101; 65/121; 65/145; 65/178; 65/253
[58] Field of Search ................. 65/101, 121, 145, 178, 65/179, 253, 254

[56] References Cited

U.S. PATENT DOCUMENTS

| | | | |
|---|---|---|---|
| 1,832,491 | 11/1931 | Locreille | 65/121 |
| 1,845,909 | 2/1932 | Drake | 65/253 |
| 1,873,866 | 8/1932 | Barker, Jr. | 65/121 |
| 2,444,731 | 7/1948 | Devol | 65/101 X |
| 2,533,826 | 12/1950 | Lyle | 65/178 X |
| 2,838,880 | 6/1958 | Bailey et al. | 65/253 |
| 2,955,384 | 10/1960 | Silverman | 65/179 X |
| 3,330,638 | 7/1967 | Brown | 65/121 X |

Primary Examiner—Arthur D. Kellogg
Attorney, Agent, or Firm—Christensen, O'Connor, Johnson & Kindness

[57] ABSTRACT

At least two differently colored components of glass are heated to a molten, viscous state and then combined in a channel shaped forehearth to form a confluent of molten glass in which the starting components remain in discrete domains, delineated by abrupt color transitions at the interfaces between such domains. The confluent flows by gravity to a discharge end of the forehearth, at which the molten glass is fed between a pair of forming rollers which press it into a continuous, elongate sheet of variegated glass. While flowing toward the discharge end of the forehearth, the molten glass is subjected to controlled, limited stirring to break up relatively large domains of homogeneous color into a multitude of smaller randomly dispersed domains characterized by streaks, swirls and waves of individually identifiable colors. A first, coarse stirring operation is performed at a location substantially upstream of the discharge end of the forehearth and consists of reciprocating a stirring paddle in a cross-channel path and thus transverse to the direction of flow of the molten glass. Downstream therefrom, gas bubbles are injected into the confluent, from the bottom of the forehearth channel, and these bubbles migrate upwardly through the viscous, molten glass, agitating, stirring and thus further dispersing the individual color domains. Finally, a second, fine stirring operation is carried out immediately adjacent the discharge end of the forehearth by manipulating another stirring paddle in a non-synchronous mixing pattern, including up and down and transverse stirring strokes which impart a final, esthetic randomness to the color domains in the glass. Adjacent the discharge end of the forehearth, the flow of molten glass is partially obstructed by a shallow weir, over which the glass flows to reach the forming rollers, and behind which a reservoir of molten glass develops to provide a source of supplemental quantities of glass, which is used as needed to compensate for transient shortfalls in the quantity of glass reaching the forming rollers.

17 Claims, 8 Drawing Figures

METHOD AND APPARATUS FOR MAKING VARIEGATED GLASS IN A CONTINUOUS SHEET

BACKGROUND OF THE INVENTION

The invention pertains to method and apparatus for making variegated glass in continuous sheet form.

The term, variegated glass, as used herein, refers to ornamental glass made by incompletely mixing two or more differently colored glass components, while they are in a molten state. While still molten, the glass is shaped to a desired form, and annealed, before the individual color components diffuse and blend into a single, homogeneous color tone. Typically, in the finished glass, the starting colors appear as distinct, readily identifiable color domains, in the form of straie, individual streaks, swirls and waves. One popular type of variegated glass is made by using a white opal as a base color, and then mixing one or more different color components into the white opal. The colors of the added components transform the white opal into a multi-colored composite, which when made into sheet form produces a semitransparent or opaque glass suitable for use in such articles as lampshades, window panes, or the like. Light when caused to filter through the glass, produces a highly esthetic appearance due to the random pattern and variety of colors therewithin.

Colored glass of this nature has been successfully made for hundreds of years using a batch process. Although individual techniques may vary somewhat, basically batch processing involves the melting of two or more glass components, of different colors, in separate pots or tanks. When sufficiently molten, the individual components are withdrawn from the pots or tanks, using a ladle, and combined on a flat, preheated steel table, where the mixing, or as it is sometimes called, marvering, proceeds to the satisfaction of the glass smith. On the table, the batch of molten glass is stirred to disperse the starting colors throughout the volume of molten glass, but without overstirring, which might cause the individual color components to diffuse and blend into an undesired, homogeneous, bland tone. Following such limited stirring, the batch of molten glass is rolled into a single, non-continuous sheet or panel. This may be done by rolling the molten glass, while it lays on the flat steel table, using a heated cylindrical roller, manipulated like a baker's rolling pin. Or the batch of molten glass may be scopped up and deposited at the feed side of a pair of counter-rotating, forming rollers which squeeze the glass into an irregularly shaped sheet which emerges from the discharge side of the rollers. One example of this batch processing for making variegated glass is disclosed in U.S. Pat. No. 1,832,491 issued to Claude Locheille.

It will be apparent that batch processing of variegated glass places severe limits on the productivity associated with the manufacture of this type of ornamental glass. The nature of batch processes makes for inefficient use of both labor and equipment, thereby producing a product which must be sold for a higher per unit cost. For these reasons, numerous prior efforts have been directed to improving the efficiency of existing variegated glass manufacturing processes, and such efforts have primarily focused on techniques and equipment for producing sheet glass on a continuous flow basis. However, because of several, subtle but critical, technical difficulties in making the transition from the batch process to a continuous flow process, previous attempts to make that transition have failed.

One of the technical obstacles involves the practical problem of reducing the length of time, in a continuous flow process, that the differently colored glass components reside together in a molten state, prior to the forming and annealing stages. In practicing the continuous process, the various color components of glass are combined and partially mixed while in a molten state. The mixed molten glass is then passed through a pair of counter-rotating forming rollers which press the glass into a continuous, elongate sheet. Unlike batch processing, in which quantities of molten glass can be combined, mixed and formed in limited amounts within a controlled cooling period during which the temperature of the molten glass drops fom the high end of its working temperature range to the low end of such range, the continuous flow process requires higher temperatures over a greater time duration in order to provide an adequate and continuous volumetric flow rate of molten glass to the forming rollers. These constraints in turn result in a prolongation of the "residency time" during which the molten glass components, reside together while flowing toward the forming rollers. The longer "residency time" produces excessive diffusion of the individual color components, i.e., interblending of the colors across domain boundaries, and thereby causing the resulting glass product to have a bland, lackluster appearance. The amount of diffusion, and thus blending of the color components, is a function of the "residency time" and previous attempts to implement continuous flow processes have required such a long "residency time" that the sheet glass produced thereby has been esthetically and commercially unacceptable, when compared to glass produced by a batch technique.

Another factor which has contributed to the lack of success of the continuous process has been found in the manner in which the molten glass is fed to the forming rollers. A common practice in making sheet glass by feeding molten glass between a pair of counter-rotating forming rollers, is to adjust the flow rate of the molten glass upstream of the rollers so that an excess reservoir of glass builds up behind and in contact with the feed rollers. Because of friction effects between the molten glass and the surfaces of the counter-rotating rollers, a strong back eddy of localized, circulating flow occurs within this reservoir of molten glass. The circulating back eddy in turn causes excessive mixing of the molten glass, thereby again producing a more homogeneous, bland coloration of the resulting glass sheet. Additionally, the reservoir of glass that builds up behind the rollers, constitutes a relatively large volume of molten glass within which glass lying near the bottom of such reservoir tends to stagnate, or at least flow at a substantially less rapid rate, than the glass adjacent the surface. The stagnating glass at the bottom of the reservoir incurs disproportionately longer "residency time," and causes the lower surface of the resulting glass sheet to have a particularly bland or "muddy" appearance.

Conversely, any attempt to reduce the "residency time" in prior continuous flow processes has resulted in inconsistent results due to insufficient mixing. For example, the "residency time" can be reduced by simply combining the differently colored glass components at a location immediately in advance of the forming rollers. This, however, results in an intolerable trade-off by reducing the adequacy of the stirring operations that are needed to sufficiently disperse the different color domains. In order to achieve acceptable dispersement, the various glass components must be combined at a location far enough upstream of the forming rollers to permit adequate stirring of the components as the relatively large volume of molten glass flows, continuously, toward the rollers. Without sufficient stirring, large sections of the resulting glass sheet appear as a single, homogeneous color. This is especially true in the case of variegated glass made by mixing one or more non-white color components into a base glass of white opal. Insufficient mixing in that case, results in a glass sheet having large areas of white, which must be either cut from the sheet, or sold as an inferior product. Also, when large areas of one color are left, this necessarily means that the remaining areas of the sheet will exhibit excessive concentrations of the additive color or colors, which also yields a less than desirable appearance.

It will be appreciated that the foregoing technical difficulties are unique to the continuous production of variegated, sheet glass, and do not apply to all continuous processes for making variegated glass. For example, as disclosed in U.S. Pat. No. 1,529,947 issued to I. H. Freese, and U.S. Pat. No. 1,828,226 issued to E. O. Hiller, continuous or semi-continuous processes have been successfully employed in the mass production of molded, variegated glass objects, such as game marbles. However, in such case, the volume of molten glass used in each mold is of such a limited amount, that the various color components of glass can be combined at a location at, or in close proximity, to the discharge spout that charges the molds. Techniques such as those disclosed in the last mentioned patents, are not applicable to continuous flow production of variegated glass in sheet form.

Accordingly, it is an object of the invention to provide method and apparatus for producing, in a continuous flow process, variegated glass in sheet form, in which the resulting sheet product exhibits discrete domains of different colors, occurring in random patterns of swirls, individual streaks, striae and waves.

Another object of the invention is to provide such a method and apparatus which is capable of consistently producing sheet glass of the variegated nature characterized above, in a semi or fully mechanized system, without requiring the skill of a journeyman glass smith in the mixing of the color components.

SUMMARY

In accordance with the method and apparatus of the invention, two or more components of glass, each of a different preselected color, are heated to a molten state, and are received by a forehearth, while in an unmixed condition. The unmixed components are caused to flow as a "plug" of molten glass toward a discharge end of the forehearth, at which counter-rotating, forming rollers receive such "plug flow" and press it into a which counter-rotating, forming rollers receive such "plug flow" and press it into a continuous, elongate sheet which then passes on to an annealing lehr. Upstream of the forehearth's discharge end, the "plug" of molten glass forms an unmixed, confluent of the differently colored glass components, which appear as distinct color streams, each stream constituting a discrete color domain and having an abrupt color transition at the interface with another such domain. The "plug flow" is established by providing a forehearth having a narrow flow channel of width substantially less than that of the forming rollers and the ultimate sheet of glass produced thereby, and by sloping such narrow flow channel a sufficient incline to cause a substantially uniform velocity profile of glass across the width of the channel.

As such confluent flows toward the discharge end of the forehearth, it is subjected to controlled stirring which partially breaks up the initially large homogeneous streams into smaller, but still discrete color domains, which are then dispersed throughout the flow.

Adjacent the discharge end of the forehearth, the above-mentioned narrow channel diverges to match the greater width of the forming rollers and the stirred confluent is partially dammed by a weir so as to form a reservoir of molten glass at a location on the upstream side of the forming rollers, and the volumetric flow rate of the "plug flow" is adjusted at the input end of the narrow channel section of the forehearth so that the amount of molten glass reaching the discharge end is just sufficient to supply the forming rollers. Such rollers are operated at a selected feed rate within a predetermined, limited range of rates, to produce a continuous sheet of glass of a given, substantially uniform width. This volumetric flow rate is at a minimum, just sufficient to meet the feed requirement of the forming rollers, without causing a buildup of excessive molten glass at the feed side of the rollers.

Additionally, the molten glass that flows naturally, without external assistance, over the weir and to the forming rollers, is frequently supplemented by scooping supplementary quantities of the stirred molten glass that exists within the reservoir behind the weir, and shoving the scooped glass over the weir to the feed side of the rollers to alleviate transient shortfalls of molten glass thereat. Such transient shortfalls occur as the result of unsteady flow of the molten glass caused by the step of adjusting the volumetric rate of flow to a minimal level, i.e., just sufficient to meet the required feed rate of the forming rollers. By damming the partially mixed confluent at a location spaced upstream from the forming rollers, and adjusting the volumetric flow rate of the moving "plug" of molten glass as described above, it has been found that overmixing of the glass components and diffusion of colors due to prolonged "residency time" which occur when excessive flow of molten glass is allowed to back up as a reservoir immediately behind the forming rollers, are substantially eliminated in the present invention. Also, since the "plug" of glass is drawn into the forming rollers after passing over the weir, a more consistent mix of the color components is achieved in the resulting sheet because the weir obstructs the direct flow into the rollers of the bottommost layer of glass which is slow moving, and thus usually overblended. The presence of the weir forces this overblended glass to be dispersed in unnoticeable amounts into the larger volumes of unblended glass in the upper regions of the flow, rather than allowing it to appear in concentrated amounts at the bottom surface of the rolled sheet.

Preferably, the flowing "plug" of molten glass is stirred by a combination of apparatus and method steps including a means and a step for imparting a coarse, transversely oriented stirring motion to the molten glass at the location in the narrow section forehearth channel where the different color components are combined; a means and a step for injecting gas bubbles into the confluent of molten glass from a bottom surface of the forehearth at a location upstream of the weir whereby the injected bubbles rise to the surface of the molten glass and thereby further breakup and disperse the discrete color domains; and a means and a step for imparting a fine mixing action to the molten glass at a location adjacent the discharge end of the forehearth at the region of divergence of the channel width, and for moving supplementary quantities of the molten glass from the reservoir behind the weir over to the feed side of the forming rollers as needed to supplement the above-mentioned transient shortfalls in the unaided flow of the glass to the rollers.

These and further features, objects and advantages of the invention will become apparent to those skilled in the art from the following detailed description and appended drawings.

DETAILED DESCRIPTION

Figures 1, 8:
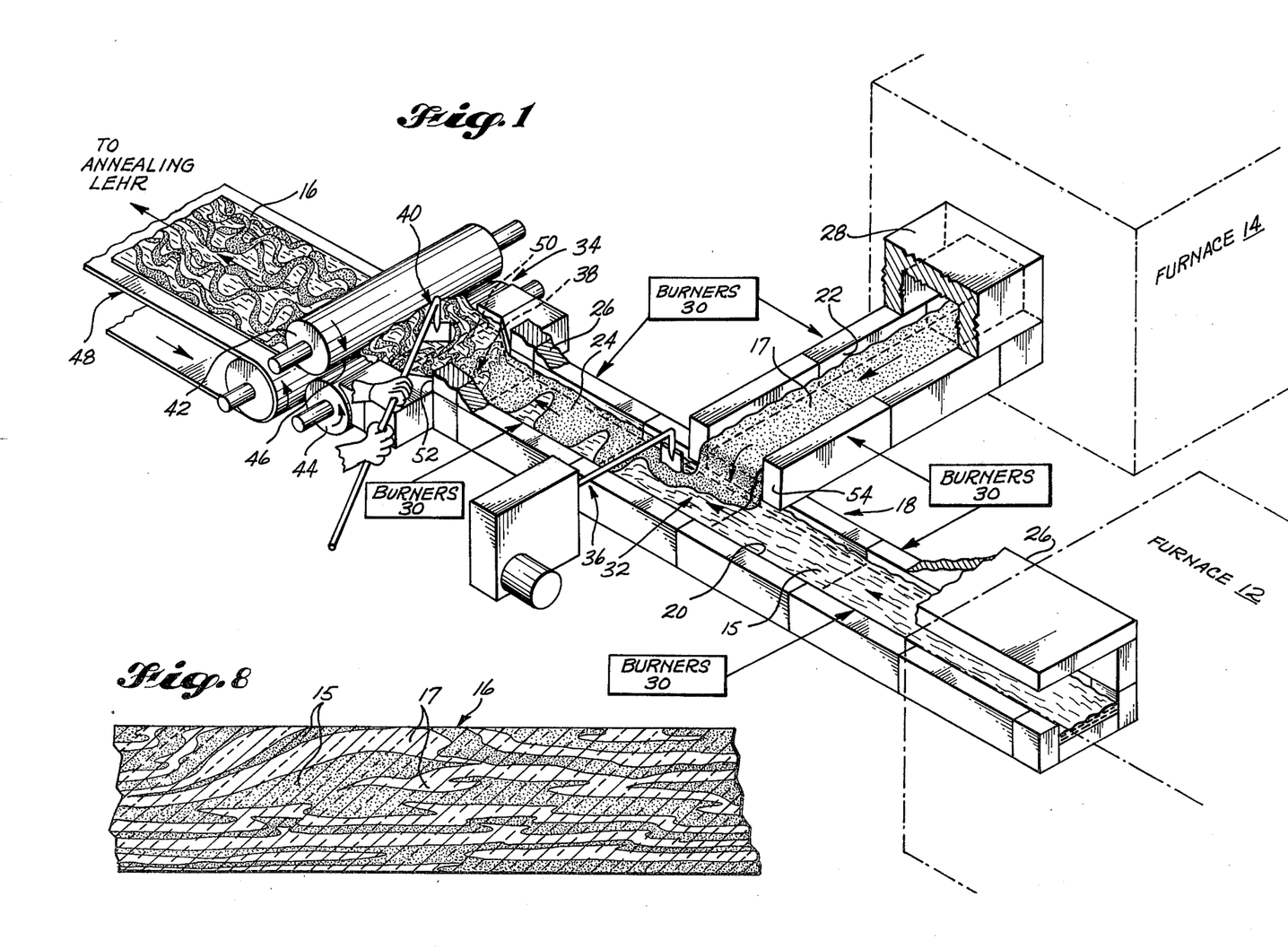
FIG. 1 is an isometric, diagrammatic view of the apparatus employed in the invention, in which portions of the otherwise completely enclosed forehearth have been cut away for clarity.
FIG. 8 is a vertical sectional view of a fragment of a sheet of variegated glass produced by the apparatus shown in FIGS. 1-6.
Figure 2:
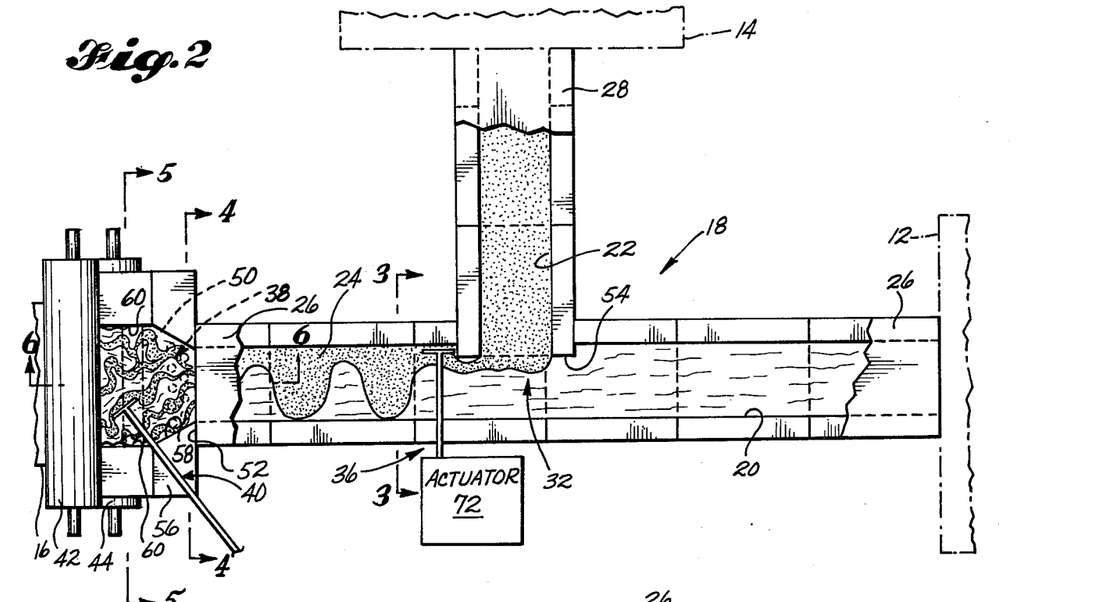
FIG. 2 is a plan view of the apparatus shown in FIG. 1.

With reference to FIGS. 1 and 2, the method and apparatus of the invention are embodied in a system for receiving molten glass of at least two different color components, after the raw glass material has been heated to a molten state by furnaces 12 and 14, and for so combining these molten glass components to produce a continuous elongate sheet 16 of ornamental, variegated glass. In this case, two separate glass components 15 and 17 are withdrawn in a molten state from furnaces 12 and 14, respectively, by a compound forehearth 18, including a primary channel 20 and a side channel 22 which merge their respective streams in a downstream section of channel 20 to form a confluent of molten glass 24. Channels 20 and 22 of forehearth 18 are made of a refractory material and are covered as indicated by structures 26 and 28 to maintain the elevated temperature of the glass, as it flows from furnaces 12 and 14. Additional heat is introduced into the covered forehearth by a series of gas burners 30 (shown schematically) mounted at spaced intervals along the side walls of channels 20 and 22. The confluent 24 is subjected to controlled, limited stirring in a downstream section of primary channel 20 that extends between the location, generally indicated by arrow 32, at which the stream of molten glass 17 from side channel 22 flows into the stream of glass 15 in primary channel 20, and a discharge end of the forehearth, indicated by arrow 34. A succession of stirring operations is performed by a coarse stirring device 36, a gas bubble injector 38 (see FIG. 4), and an operator manipulated implement 40, the latter for imparting a fine stirring motion to the molten glass adjacent discharge end 34 of forehearth 18.

Located immediately downstream of discharge end 34 is a pair of counter-rotating forming rollers 42 and 44 which define a nib 46 therebetween into which the molten glass is fed and thereby pressed into a ribbon that forms sheet 16. As sheet 16 emerges from the downstream side of rollers 42 and 44, it is still soft and pliable. While in this state, sheet 16 is received and advanced downstream by a conveyor 48, where it passes into and through a conventional annealing lehr, the specific construction and operation of which are well known, and for this reason are not shown or further described. As more fully disclosed hereinafter, primary channel 20 of forehearth 18 is for most of its length substantially narrower than rollers 42 and 44 (and thus sheet 16) and diverges adjacent discharge end 34 to match the width of the rollers. Also adjacent end 34, channel 20 is provided with structure forming a shallow weir 50 over which the stirred confluent 24 of molten glass must either flow, or be impelled by external means, such as implement 40, in order to reach the feed side of rollers 42 and 44.

Now with specific reference to the construction of forehearth 18, primary and side channels 20 and 22, respectively, are constructed of refractory brick to form shallow, channel-shaped flow troughs that are inclined downwardly in the direction away from furnaces 12 and 14 so that the molten glass flows by gravity toward discharge end 34 of channel 20. To establish the above-mentioned "plug flow" it has been found necessary to reduce the width of the primary flow channel 20 to a dimension that is substantially less than the nominal width of the rollers 42 and 44 (and thus less than the desired width of the resulting sheet 16) and increase the downslope of the channel in the direction of flow so that the depth of the flowing glass is minimal and is approximately the same as in a wider channel, but the velocity of flow is significantly greater to compensate for the reduced channel width and still meet the feed requirement of the forming rollers which is fixed by other factors such as the rate at which the glass cools as it is being formed.

As a result, the velocity profile of the flowing glass is more uniform when measured at different points across the channel. The more uniform velocity in turn means that the bulk of the molten glass is moving as a cohesive unit along the channel, in which no one segment of the flow cross section has a substantially different velocity than any other flow segment. This uniform velocity profile has been referred to as a "plug flow" and has been a critical factor in achieving a needed reduction and uniformity in the "residency" time of the molten glass as it passes from the location in the forehearth where the different color components are combined to the forming rollers. As an example, for a length of channel 20 between the point of confluence 32 and discharge end 34 of 8 feet, a residency time of approximately 5 minutes has been achieved, whereas the flow in a channel having a width equal to the rollers and a lesser downslope may exhibit a residency time of as much as 15 minutes for slower flowing glass adjacent the channel sides.

The structures 26 and 28 which cover channels 20 and 22 are made of a refractory brick and are constructed so that structure 26 commences with channel 20 at furnace 12 and extends from furnace 12 to an end 52, which terminates short of discharge end 34 of the forehearth. Covering structure 28 extends from furnace 14 to a junction (not shown) with structure 26 adjacent an end 54 of side channel 22. As best shown in FIG. 2, primary channel 20 is extended beyond the termination end 52 of covering structure 26 by a block 56 of refractory material that has side wall portions 58 which diverge laterally outwardly in the direction of flow so as to widen the flow channel to match the width of rollers 42 and 44 and thus the desired width of sheet 16, and has parallel side wall portions 60 which extend downstream from side wall portions 58 and terminate generally at the nib 46 of forming rollers 42 and 44. Block 56 includes structure that defines weir 50, and also mounts a series of vertically oriented pipes which constitute parts of bubble injector 38. Covering structure 26 for primary channel 20 terminates at end 52, corresponding to the upstream edge of block 56 so that the molten glass is exposed as it flows through the diverging channel formed by block 56, enabling an operator to monitor the adequacy of the flow and use implement 40, in addition to its use for fine stirring, to augment the movement of the molten glass over weir 50 to the feed side of rollers 42 and 44.

Figure 3:
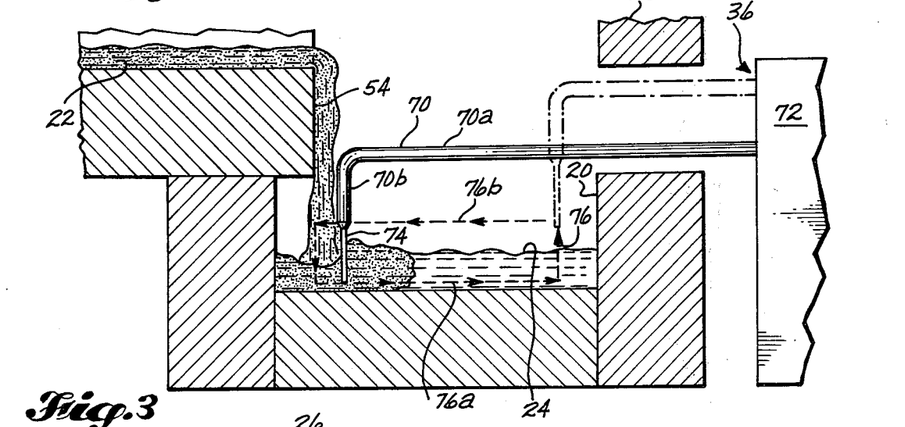
FIG. 3 is a transverse, sectional view of the apparatus of FIGS. 1 and 2, and is taken along section line 3—3 of FIG. 2.

With reference to FIG. 3, coarse stirring device 36 includes a rigid L-shaped, hollow, water cooled rod 70 having a horizontally disposed portion 70a extending transversely of channel 20 from an actuator 72 located to one side of channel 20, and a bent end portion 70b that projects downwardly from an end of portion 70a and that mounts a stirring paddle 74. Rod 70 and paddle 74 are disposed for reciprocation in a vertical plane oriented transversely to channel 20 and disposed just downstream of location 32 at which the streams of glass merge in primary channel 20. Actuator 72 may be constructed in any suitable fashion for automatically moving rod 70 in a series of successive horizontal and vertical movements to trace out a rectangular path indicated by dotted line 76. Path 76 includes a stirring stroke 76a, during which paddle 74 is submerged in molten confluent 24, that extends from the side of channel 20 adjacent end 54 of channel 22 to the opposite side of channel 20 adjacent actuator 72, and a return stroke 76b which returns paddle 74, while elevated above molten confluent 24, to the side of channel 20 adjacent end 54 of channel 22. At the end of stirring stroke 76a, rod 70 is raised to lift paddle 74 out of the molten glass, and at the end of return stroke 76b, rod 70 is lowered to submerge paddle 74 in confluent 24.

Actuator 72 continuously moves rod 70 and its associated paddle 74 through the above-described cyclical path thereby effecting a coarse stirring action of the confluent which periodically displaces the stream of glass component 17 that originated from side channel 22 and furnace 12, across the width of the stream of molten glass component 15 in channel 20 that originated in furnace 14. The stirring action of device 36 thereby produces a serpentine-shaped distribution of the components of molten glass which are initially combined at location 32. The relative narrowness of channel 20 (as described above) aids in this coarse stirring operation by allowing device 36 to intermix the streams of glass components 17 and 15 while they are concentrated in channel 20, using a relatively short cross channel stirring stroke, whereafter the mixed confluent 24 spreads outwardly to the desired width at the discharge end 34 of the channel.

Any number of available mechanisms and devices may be used for implementing the above-disclosed functions of actuator 72. For example, the abovedescribed rectangular path 76 of paddle 74 is readily achieved by combining two, successively operated, double acting, air cylinders, a first of which is arranged to reciprocate rod 70 in the horizontal strokes 76a and 76b, and a second of which is arranged to displace rod 70 in the up and down strokes that occur, respectively, at the end of horizontal strokes 76a and 76b.

Figure 4:
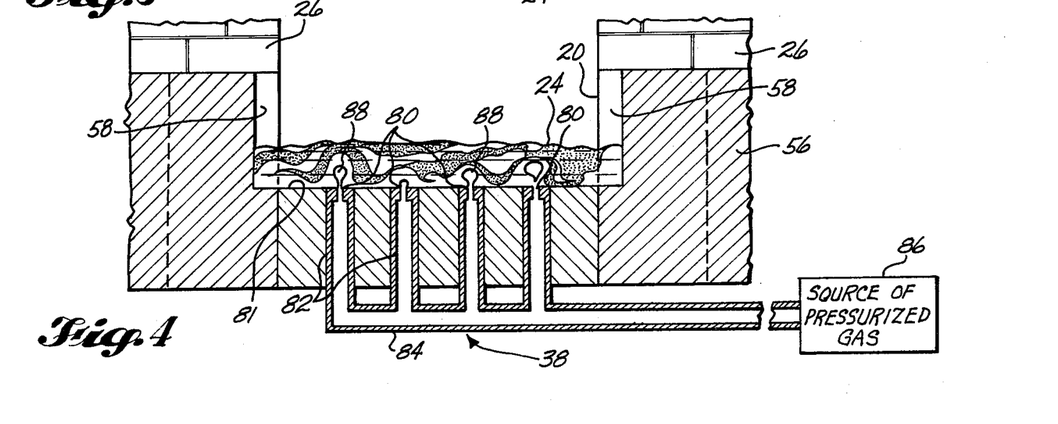
FIG. 4 is another transverse, sectional view taken along section line 4—4 of FIG. 2.

With reference to FIG. 4, a second stirring action is achieved at a location downstream of coarse stirring device 36, by a bubble injector 38 which includes a plurality of gas discharge ports 80 arrayed in spaced relation across the bottom section of primary flow channel 20 that is defined by block 56. In this instance two transversely oriented rows of ports 80 are provided (see FIG. 2). These ports are connected by conduits 82 which extend downwardly through the refractory material that forms block 56 to a manifold 84 which connects the plurality of ports to a common source of pressurized gas 86. Ports 80 have a reduced size relative to conduits 82 so as to meter the quantity of gas that is injected into the confluent 24 of molten glass at a preselected rate, which in turn determines the size and frequency of the gas bubbles 88 which develop in the molten glass. These bubbles 88 rise slowly in the viscous confluent 24 and in so doing, the discrete color domains which are partially mixed by the coarse stirring operation are further broken up and dispersed into smaller, but still discrete domains of color. The upper extremity of bubbles 88 tends to push color domains that are initially adjacent bottom 81 of channel 20 upwardly into and through different color domains, while the trailing portions of the bubbles tend to entrain other color components upwardly to the surface of confluent 34. The result is a more even distribution of the color domains, without causing excessive mixing or blending.

Figure 5:
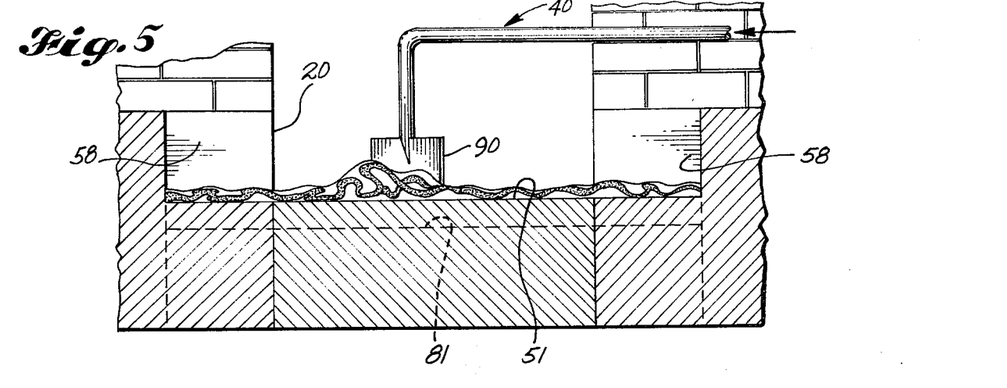
FIG. 5 is still a further transverse, sectional view taken along section line 5—5 of FIG. 2.
Figure 6:
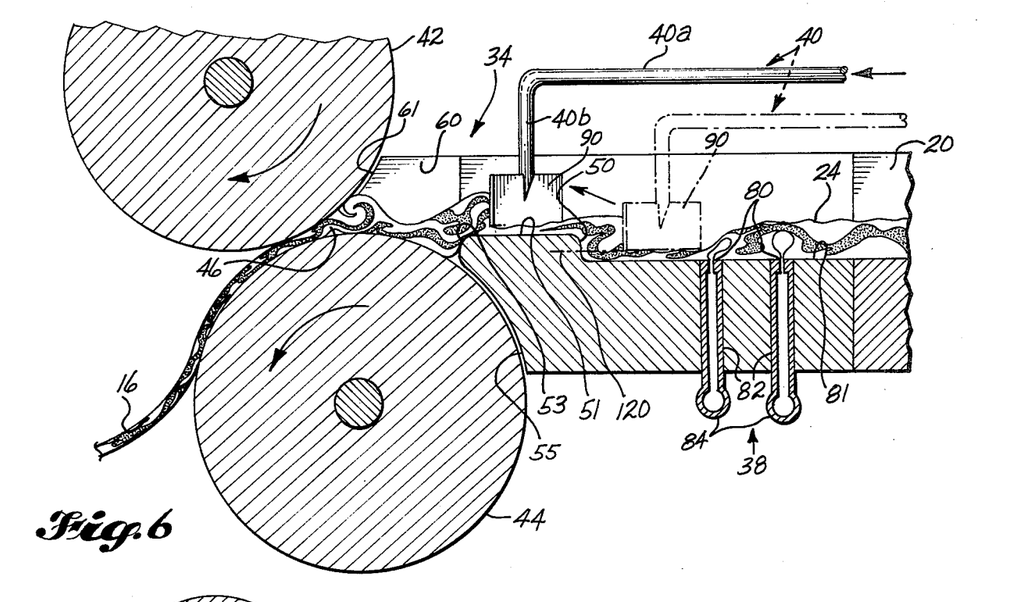
FIG. 6 is an enlarged vertical sectional view taken generally along section line 6—6 of FIG. 2.

With reference to FIGS. 5 and 6, the final stirring operation is effected by implement 40, which in the presently disclosed embodiment is manipulated by an operator that monitors the flow of molten glass as it passes from the covered section of channel 20 and traverses the diverging channel section formed by block 56 and flows toward forming rollers 42 and 44. In particular, as shown in FIG. 6, implement 40 includes an elongate handle portion 40a and a bent, downwardly oriented end portion 40b which mounts a paddle 90. The fine stirring action of implement 40 is effected by reciprocating paddle 90 back and forth across channel 20 while concurrently agitating paddle 90 up and down so as to insure substantially uniform dispersal of the broken-up, discrete domains of color throughout the entire molten body of confluent 24. The coarse stirring action of mechanism 36, and the dispersement effected by bubbles 88 from injector 38, may still leave unacceptably large pockets of homogeneously colored glass, and the fine stirring action of implement 40 is needed to stir different color components into and through these homogeneous pockets.

Additionally, as discussed in greater detail below, implement 40 is used as depicted in FIG. 5, to scoop and shovel additional quantities of molten glass, available in a reservoir of the glass behind weir 50, up over weir 50, to supplement transient shortfalls of inadequate amounts of glass for feeding forming rollers 42 and 44. For mixing purposes, implement 40 and paddle 90 thereof are manipulated in a generally transversely oriented and concurrent up/down movement at a location upstream of weir 50 as shown by the dotted line position of paddle 90 in FIG. 6. To move supplementary quantities of glass over to rollers 42 and 44, paddle 90 is displaced from the dotted line position in FIG. 6, to the solid line position in FIG. 6, thereby shoveling a glob of molten glass from the reservoir behind weir 50 up over weir 50 and over to the feed side of rollers 42 and 44. FIG. 5 illustrates the movement of paddle 90, in pushing a glob of glass over weir 50, looking upstream from the location of the rollers.

The structure on block 56 which defines weir 50 has an associated flat upper surface 51 that extends downstream from the top of weir 50 to the discharge end 34 of channel 20 at which surface 51 is blended into a rounded terminal edge 53. The flowing, molten glass traverses surface 51 and flows over rounded edge 53, and drops onto the forwardly rotating, upper surface of lower roller 44 and thence into the nib 46 between the rollers. As best shown in FIG. 6, the lower portion of block 56 at discharge end 34 is formed with arcuate contour 55 mated to the cylindrical surface of lower roller 44. Similarly, the upper structure of the block that forms side walls 60 is shaped with arcuate contours 61 mated to the cylindrical surface of upper roller 42. With the structure of block 56 so shaped and mated to rollers 42 and 44, the molten glass is constrained to flow from the discharge end 34 of the forehearth into the nib 46 between the rollers.

The above-described apparatus is designed so that the flow of molten glass in forehearth 18 can be adjusted to a minimal, volumetric rate, just sufficient to supply adequate glass to forming rollers 42 and 44 for producing a sheet 16 having a uniform, predetermined width. By so adjusting the flow rate, and establishing the above-characterized "plug flow," it has been found possible to substantially eliminate certain undesirable characteristics, such as excessive diffusion of colors due to stagnation, and excessive mixing of colors due to back eddy currents. Excessive diffusion and overmixing occur in a high-level ("non-plug") flow process used for roll forming transparent or homogeneously blended, single color glass as discussed more fully hereinafter. Also, the "plug flow" that must exit in practicing the present invention has the added advantage of constantly purging the bottom and sides of the forehearth channel of color contaminates, left over from earlier, excessive concentrations of one or more components of added, colored glass.

To create the "plug flow" as described above, it has been found necessary as described above to reduce the width of the channel in which confluent 24 flows, increase the velocity of the flow and maintain the overall volumetric rate of flow just marginally sufficient to meet the independently set feed rate of the rollers. In particular, it has been determined that the width of primary flow channel 20 in the section in which the glass components are combined must be no greater than a maximum of ten (10) inches, and the depth of the confluent between bottom wall 81 of channel 20 and the surface of the molten glass must be no greater than a maximum of two (2) inches. To provide a sufficient volumetric flow of molten glass for making sheet 16 of a commercially acceptable width, e.g., approximately 24 inches, it has been found that the minumum width of channel 20 is five (5) inches, and the minimum depth of the confluent 24 is one (1) inch. The downslope of the channel should have a drop of between 1/16" and 3/16" per 1 foot of channel length and preferably have a ⅛" drop per foot. Within these constraints, a "plug flow" can be maintained at a flow rate within the range of 18-36 pounds per minute for glass temperatures within the range of 2,100 to 2,500 degrees Fahrenheit and a viscosity of approximately $10^3$ poises.

Having established the desired conditions for "plug flow," it has further been found that due to frictional effects, inertia and other flow characteristics of the highly viscous molten glass, there is a tendency of the glass to exhibit transient flow deficiencies at the feed side of forming rollers 42 and 44. In particular, with the "plug flow" being intentionally adjusted to provide the minimum amount of molten glass required by rollers 42 and 44 for forming sheet 16, the rollers become intermittently and temporarily starved for molten glass. This shortfall of glass is only transient and is eventually satisfied by the continuing flow of confluence 24 toward the rollers. However, during these transient periods, the shortfall of glass causes forming rollers 42 and 44, which are necessarily operated at a constant feed rate, to produce a sheet of glass that is of erratic width, necking down to undesirably small widths when the rollers are starved for more glass.

In accordance with the invention, this deficiency is overcome by the provision of weir 50 which develops a reservoir of molten glass that is readily available for supplementing temporary shortfalls at nib 46 of the rollers. For this purpose, paddle 90 of implement 40 as depicted in FIGS. 5 and 6 is used to scoop, push or draw globs of the stirred glass from the reservoir behind weir 50 and displace it over surface 51 into feed relation with nib 46 of the forming rollers so that a sheet 16 of uniform width is produced.

Figure 7:
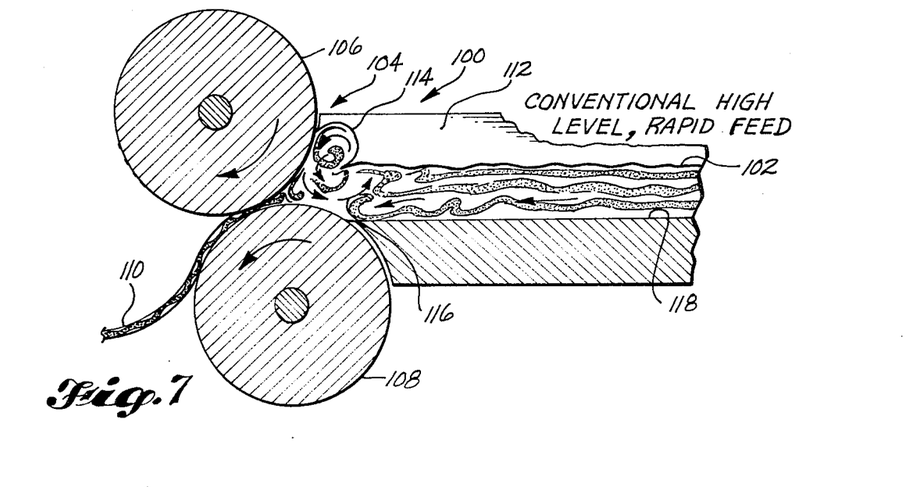
FIG. 7 is a vertical sectional view similar to FIG. 6, and showing, for comparison purposes, one prior art technique for making transparent or homogeneously colored sheet glass using a superficially similar, but actually quite different process.

The intentionally low-volumetric "plug flow" rate of the molten glass as depicted in FIGS. 5 and 6, is contrasted with a conventional high-level, high-volumetric rate feed process 100 as depicted in FIG. 7. Glass forming process 100 as shown is typical of an older, but common technique for rolling homogeneously blended, molten glass by feeding a relatively high level of glass 102, at a relatively rapid volumetric rate toward a discharge end 104 of a forehearth channel. At end 104, a pair of counter-rotating forming rollers 106 and 108 are positioned for pressing the molten glass into a sheet 110. Because of the high flow level of glass 102, excess glass backs up behind rollers 106 and 108 and forms a large back eddy 114 in which the molten glass circulates in a counter-clockwise direction, as indicated by arrows 116 in FIG. 7. When the resulting glass sheet 110 is to be transparent, or of a homogeneously blended single color, the large back eddy 114 is not undesirable, and in fact assists in the blending of the glass by the agitating action of back eddy currents 116. However, in the environment of the present invention, the excessive back eddying of the glass overmixes the discrete color domains, and interferes with the otherwise controlled, limited stirring performed by mechanism 36, bubble injector 38 and implement 40. Another undesirable characteristic of process 100 in the environment of the present invention is that the back eddy 114 accentuates the rate of flow of material that lies immediately adjacent the surface of molten glass 102, while retarding the rate of flow of the molten glass adjacent the bottom 118 of channel 112. As a result, the glass near bottom 118 tends to stagnate, and remain in the forehearth channel 112 for a disproportionately longer time than molten glass near the surface. If process 100 is used to make variegated glass, then the disproportionately longer "residency time" of glass near bottom 118 produces overblending of the color domains for a large segment of the reservoir of glass waiting to be fed into forming rollers 106 and 108. Further still, because of the more rapid flow of material adjacent the surface of molten glass 102, if process 100 is used to make variegated glass, there is a tendency to rapidly stir the upper level of flow in order to achieve the desired amount of color dispersion. In so doing, the more stagnate glass adjacent bottom 118 is over-stirred.

The foregoing deficiencies of the conventional, high-level, rapid feed process 100 when applied to a continuous method of making variegated glass, as shown in FIG. 7, are substantially eliminated in the present invention by establishing the low-level, "plug flow" in primary channel 20 and by providing the shallow weir 50 adjacent the discharge end 34 of such channel. The height of weir 50 is critical. It cannot be so high relative to the bottom 81 of channel 20, as shown in FIG. 6, that the depth of the "plug" of molten glass 24 behind weir 50 is greater than the above-mentioned maximum depth of two (2) inches. The minimum height of weir 50 relative to bottom 81 must be such as to form an adequate reservoir of molten glass for supplementing, on a short term basis, transient shortfalls of material at forming rollers 42 and 44. Given these constraints, it has been found that the height of weir 50 must be within a range of ¼ to ¾ of the average depth of confluent 24 above bottom 81 of channel 20. The dimension of surface 51 in the longitudinal direction of channel 20 is not critical, but in general should be as short as possible to place weir 50 as close as possible to rollers 42 and 44.

Weir 50 provides an additional advantage in enabling implement 40 to stir and thus disperse the color components in confluent 24 at a level 120 as shown in FIG. 6 that is below the upper edge of weir 50. The top of weir 50 and the associated surface 51 thereof define the level of draw of the molten glass in its flow toward the forming rollers. In other words, in the absence of weir 50, the molten glass would flow directly along bottom surface 81 into feed relationship with rollers 42 and 44, causing the bottom surface of the "plug" of molten glass to develop certain undesirable surface effects. Namely, these undesired surface effects occur in the form of continuous longitudinal striae, caused by the frictional contact of the lower surface of the "plug" flow with the bottom 81 of the forehearth channel. However, the provision of weir 50 interrupts this continuous, longitudinal frictional interaction between the lowermost layer of the "plug" flow and bottom 81 of channel 20, and instead causes the major portion of the glass, existing above the lowermost layer, to be drawn off over weir 50 and along surface 51 into feed relationship with rollers 42 and 44.

Substantially all of the molten glass that is advanced over weir 50 and directly into feed relationship with the rollers, comes from the upper 90% or more of the confluent 24, where the color domains are most distinct, and not from the thin, lowermost layer of glass adjacent bottom 81. This bottommost layer of glass has the undesirable, longitudinally continuous striae as described above, and also exhibits undesirable overblending and color diffusion due to the frictional drag between the flowing glass and bottom 81 which increases the "residency time" of such layer and gives it a "muddy" appearance. In this regard, it is noted that the "plug" flow that is established does not totally overcome excessive residency time at the bottommost layer of molten glass, but it does reduce to a very minimum, the volume proportion of glass in confluent 24 that has a greater "residency time" due to the friction caused, velocity gradient immediately adjacent bottom 81. But the bottommost layer of glass which is unavoidably overblended and is thus dull or "muddy" in appearance, is blocked by weir 50 from passing directly into and through rollers 42 and 44 and rather is deflected into and constantly absorbed by the bulk of the molten glass thereabove. Thus, the overblended "muddy" glass adjacent the bottom of confluent 24 is not allowed to pass in concentrated form through rollers 42 and 44 and thereby ruin the bottom surface of the resulting glass sheet 16.

An example of the variegated glass sheet 16 is shown in cross section in FIG. 8. As illustrated therein, the dispersed domains of color components 15 and 17 are discrete, each domain exhibiting an abrupt color transition at the interface with another domain of color. Since the glasses are usually translucent, and because the color domains tend to stratify (i.e., form superimposed layers), an esthetic effect is achieved when light is caused to pass through the sheet, thereby producing an infinite mixture of shades and color tones, that vary as the number, relative thickness and relative depth of the multiple strata of domains varies. In other words, the domains of color remain in themselves discrete, but the superpositioning of the randomly arranged layers of individually discrete colors cause the light passing through the sheet to mix the colors in an infinite number of ways.

While the foregoing description pertains to appratus and method for forming confluent 24 by flowing two streams of molten glass into the primary flow channel 20 of forehearth 18, the invention can also be carried out by adding further side channels similar to channel 22 for introducing three or more color components into the primary channel. Also, the invention can be practiced by establishing a first stream of flowing molten glass, such as in primary channel 20, and then adding a stream or intermittent batches of a differently colored glass component or components in the form of color concentrated frit, i.e., a raw material used in glass making available as granulated or broken glass particles. In such case, frit of selected color or colors is discharged into a stream of glass in a primary forehearth channel, and is quickly melted by the larger bulk of already hot, molten glass. To achieve the variegated effect desired by the invention, the frit is introduced into the already molten glass as a stream or in intermittent batches so that the resulting confluent is similar to two or more individual streams of already molten glass flowing together as in the case of the previously described embodiment. Downstream of the location at which the frit is introduced, the succession of stirring operations is performed in the same manner as described above, by a coarse stirring device 36, a bubble injector 38 and a fine stirring implement 40 (FIGS. 1 and 2).

Having described in both general and detailed terms, the principles of the invention and its practice, it is now appropriate to set forth a specific example in accordance with the invention.

For a primary flow channel 20 (FIG. 1) having a length of 8 feet between the location 32 of confluence of the glass components and the discharge end 34, and a width of 9 inches diverging to a width of 25 inches at the forming rollers, the following parameters have been successfully used:

1. Two differently colored, soda-lime-silica glass components were mixed including a white opal consisting of $SiO_2$ 64.2%, $Na_2O$ 15.4%, $CaO$ 7.5%, F 7.3% and $Al_2O_3$ 5.6% (by weight), and a blue glass consisting of $SiO_2$ 69.6%, $Na_2O$ 0.17%, $CaO$ 9.5%, $B_2O_3$ 0.65%, $Al_2O_3$ 0.66%, F 1.97%, $Cu_2O$ 0.60%, and $CoO$ (cobaltic oxide) 0.04% (by weight).

2. The white opal was prepared in furnace 12 and introduced into channel 20, while the blue component was prepared in furnace 14 and introduced into side channel 22 (FIG. 1) at a rate such that the confluent 24 of the glass components downstream of the location 32 at which the components are combined flowed at approximately 22.5 pounds per minute (or 0.150 ft.$^3$/min. volumetric rate). (The precise ratio between the color components was varied, and is not critical.)

3. The forming rollers were approximately 4.80 inches in diameter and were rotated at a rate selected to cause the glass sheet 16 to be discharged at approximately 7.5 running feet per minute, taking into account an approximately 8% slippage in the rotation of the roller versus the velocity of the produced sheet 16. Sheet 16 was approximately ⅛ inch thick and had a nominal width of 24 inches and typically varied between 25 and 26 inches in width, enabling the sheet to be subsequently trimmed to the commercial standard of 24 inches in width.

4. The temperature at the location 32 (FIG. 1) where the glass components are combined was 2500° F., dropping to 2300° F. at the forming rollers, while the viscosity centered around $10^3$ poises.

5. The depth of confluent 24 upstream of weir 50 was ⅜ of an inch.

6. Coarse stirring device 36 was driven at a stirring rate that took approximtely one second per horizontal stroke (each of stroke paths 76a and 76b), and approximately ⅓ of a second for the vertical movements (strokes 76).

7. Bubble injector 38 was charged with air pressure in the range of ¼ to 5 pounds per square inch above atmosphere, and 9 bubble discharge ports were used causing each port to produce approximately ½ to 2 bubbles per second.

8. The fine stirring implement 40 was manually reciprocated at a rate of approximately one cross-channel stirring stroke per second. Successive strokes of implement 40 displace paddle 90 back and forth across the channel in the region of divergence formed by side walls 58 (FIG. 2).

While only a particular embodiment of the invention has been disclosed herein, it will be readily apparent to persons skilled in the art that numerous changes and modifications to the method and apparatus described above can be made without departing from the spirit of the invention.

The embodiments of the invention in which an exclusive property or privilege is claimed are defined as follows:

1. A process for making variegated glass in continuous sheet form, comprising:
   heating first and second components of glass of different, preselected colors to a molten state;
   introducing said components of glass into a channel shaped forehearth and establishing a "plug" flow of said components toward a discharge end of said forehearth, said "plug" flow being an unblended confluent of said first and second components of glass while in said molten state wherein said components remain in discrete domains having substantially abrupt transitions in color at the interfaces between such domains;
   stirring said confluent as it flows in said forehearth so as to break up and disperse said domains throughout the volume of said confluent while maintaining said substantially abrupt transitions in color between said domains;
   flowing said confluent over a weir, located at the discharge end of said forehearth, into a feed side of a pair of forming rollers which press the confluent of glass into the shape of a continuously elongate sheet;
   adjusting the volumetric flow rate of said confluent by so metering the rate of introduction of said components into said forehearth and by so inclining said channel shaped forehearth so that said flow rate is just sufficient to supply enough molten glass at the discharge end of the forehearth for enabling the forming rollers to produce said sheet with a substantially uniform predetermined width, without causing a buildup of excessive molten glass at the feed side of said rollers; and
   supplementing the volume of said confluent of molten glass that flows naturally, by gravity over said weir and to the feed side of said forming rollers with supplementary quantities of molten glass taken from a reservoir of said confluent of glass that develops on the upstream side of said weir in order to alleviate transient shortfalls of said confluent at the feed side of said rollers, wherein said transient shortfalls occur as a result of unsteady flow of said confluent due to frictional effects in conjunction with said step of adjusting the volumetric flow rate of said confluent to be just sufficient to supply said forming rollers.

2. The process of claim 1 wherein said step of heating and combining said first and second components of glass comprises the substeps of heating said first component of glass in a first furnace and flowing the molten glass resulting therefrom in a main channel of the forehearth having said discharge end, and heating said second component of glass in a second furnace and flowing the molten glass resulting therefrom in a side channel of the forehearth that extends between said second furnace and said main channel of said forehearth for discharging the second component of molten glass into the main channel at a predetermined location upstream from said discharge end to thereby form said confluent.

3. The process set forth in claim 1 wherein the width of said channel shaped forehearth at locations upstream of said discharge end is substantially less than said predetermined width of said sheet, and said forehearth widens to substantially equal said predetermined width adjacent said discharge end.

4. The process set forth in claim 3 wherein the depth of the confluent of molten glass is within the range of 1 to 2 inches, inclusive, and wherein the height of said weir is within the range of ¼ inch to ¾ inches, inclusive.

5. The process set forth in claim 4, wherein said width of said forehearth at said locations upstream of said discharge end is within the range of 5 to 10 inches, inclusive.

6. The process set forth in claim 1, wherein the temperature of said molten glass of said first and second components when in said forehearth lies within the range of 2,100 to 2,500 degrees Fahrenheit.

7. The process set forth in claim 1, wherein said flow rate of said confluent by weight is within the range of 18 to 36 pounds per minute.

8. The process set forth in claim 1, wherein said step of stirring comprises the substeps of:
   reciprocating a stirring paddle while submerged in said confluent across said channel shaped forehearth in stirring strokes oriented transversely to the direction of flow of said confluent; and
   injecting gas bubbles into said confluent of molten glass from the bottom of said forehearth.

9. The process set forth in claim 8, wherein said step of injecting gas bubbles is further defined by injecting gas bubbles from each of a plurality of bubble forming discharge ports provided at the bottom of said forehearth and adjusting the rate of bubble formation at each such port to produce bubbles at the rate of one-half to two bubbles per second, inclusive.

10. The process set forth in claim 1, wherein said step of stirring comprises the substeps of:
   reciprocating a first stirring paddle in a predetermined stirring pattern that includes stirring strokes oriented transversely to the direction of flow of the confluent of molten glass in said forehearth at a location substantially upstream of said discharge end of said forehearth;
   moving a second stirring paddle in up and down and cross-channel movements at a location downstream of said first stirring paddle and adjacent to the discharge end of said forehearth; and
   injecting gas bubbles into said confluent of molten glass from the bottom of said forehearth and at a position along said forehearth that is downstream of said first stirring paddle.

11. A process for making variegated glass in continuous sheet form, comprising:
   heating first and second components of glass of different, preselected colors to a molten state;
   introducing said components of glass while in said molten state into a first end of a forehearth channel and flowing said molten glass as a confluent of said first and second components toward a discharge end of said forehearth channel, wherein said components remain in discrete domains of homogeneous color;
   establishing a "plug" flow of said confluent in said forehearth channel by shaping, dimensioning and inclining said channel so that said confluent of molten glass has a substantially uniform velocity profile across said channel;
   stirring said confluent as it flows in said forehearth channel to cause limited, controlled mixing of said first and second components of glass while maintaining said domains of homogeneous color; and
   forming said partially mixed confluent into a continuously elongate sheet of glass by feeding the stirred confluent over a weir oriented across said channel at said discharge end thereof and into the feed side of a pair of forming rollers which receive and press said confluent into said sheet.

12. The process set forth in claim 11, wherein said step of forming said stirred confluent into said continuously elongate sheet comprises the further substeps of:
   causing said "plug" flow to diverge in the downstream direction adjacent the location where said confluent is fed over said weir to the feed side of said forming rollers.

13. The process set forth in claim 11, wherein said step of establishing said "plug" flow comprises the further substep of:
   adjusting the flow rate of said confluent at said first end of said forehearth channel so that said flow rate is just sufficient to supply enough molten glass at said discharge end of said channel for enabling said forming rollers to produce said continuously elongate sheet with a substantially uniform, predetermined width, without causing buildup of excess molten glass at the feed side of said rollers.

14. In an apparatus for producing variegated glass in continuous elongate sheet form and including a channel shaped forehearth into which molten glass prepared from at least first and second differently colored glass components is introduced at a receiving end of said forehearth and the confluent thereof is caused to flow by gravity toward a discharge end of said forehearth at which forming rollers receive the molten glass and press it into a continuous elongate sheet of glass having a predetermined minimum width, wherein the improvement comprises:
   said forehearth having a width that is substantially less than said predetermined width of said sheet at locations upstream of said discharge end and being inclined downwardly in the direction of flow and being divergent in the direction of flow at a location adjacent said discharge end so that the flow of said confluent widens to match said predetermined minimum width of said sheet as said confluent passes through said forming rollers;
   structural means disposed in said channel shaped forehearth adjacent said discharge end forming a cross-channel weir of preselected height, over which the confluent of molten glass must flow to reach said forming rollers; and
   means for stirring the confluent of molten glass while in said forehearth, said means for stirring being disposed upstream of said structural means forming said weir.

15. The improvement set forth in the apparatus defined in claim 14, wherein said means for stirring comprises:
   a stirring paddle for being submerged in said confluent of molten glass, and an associated mechanized means for automatically reciprocating said paddle in a path including a stirring stroke oriented crosswise to the direction of flow of said confluent in said forehearth; and
   gas conduit means and an associated gas supply means for supplying pressurized gas thereto, said gas conduit means and supply means arranged for injecting bubbles of gas into said confluent from a bottom of said channel shaped forehearth at a location adjacent to and upstream of said structural means providing said weir.

16. The improvement in the apparatus set forth in claim 14, wherein said stirring paddle is disposed at a location upstream of the divergence of said channel shaped forehearth.

17. The improvement in the apparatus set forth in claim 14, wherein said forehearth comprises a main flow channel having said receiving end for receiving said first colored glass component and having said discharge end, said forehearth also comprising a secondary flow channel that discharges into said main flow channel adjacent the latter's receiving end for receiving and flowing said second colored glass component into said main flow channel to form said confluent therein, and said means for stirring said confluent being disposed downstream of the location at which said secondary flow channel discharges into said primary flow channel.

* * * * *